US009920163B2

(12) United States Patent
Honcoop et al.

(10) Patent No.: US 9,920,163 B2
(45) Date of Patent: Mar. 20, 2018

(54) POLYESTER POLYOL FOR USE IN POLYURETHANE

(71) Applicant: PURAC BIOCHEM BV, Gorinchem (NL)

(72) Inventors: Wilhelmus Jacobus Adrianus Honcoop, Bergambacht (NL); Chris François Hubert Schaekens, Nijmegen (NL); Jurgen Cornelis Henricus Maas, Tilburg (NL); Mauraline Alison Maxine Gumbs, Dordrecht (NL)

(73) Assignee: PURAC BIOCHEM BV, Gorinchem (NL)

( * ) Notice: Subject to any disclaimer, the term of this patent is extended or adjusted under 35 U.S.C. 154(b) by 0 days.

(21) Appl. No.: 14/391,516

(22) PCT Filed: Apr. 15, 2013

(86) PCT No.: PCT/EP2013/057839
§ 371 (c)(1),
(2) Date: Oct. 9, 2014

(87) PCT Pub. No.: WO2013/156450
PCT Pub. Date: Oct. 24, 2013

(65) Prior Publication Data
US 2015/0031848 A1    Jan. 29, 2015

Related U.S. Application Data

(60) Provisional application No. 61/766,147, filed on Feb. 19, 2013, provisional application No. 61/624,411, filed on Apr. 16, 2012.

(30) Foreign Application Priority Data

Apr. 16, 2012  (EP) .................................... 12164256
Feb. 19, 2013  (EP) .................................... 13155775

(51) Int. Cl.
C08G 63/60    (2006.01)
C08G 18/42    (2006.01)
(Continued)

(52) U.S. Cl.
CPC ............. *C08G 63/60* (2013.01); *C08G 18/10* (2013.01); *C08G 18/3206* (2013.01);
(Continued)

(58) Field of Classification Search
CPC .. C08G 18/428; C08G 18/4286; C08G 63/63; C08G 18/4266; C08G 18/348
See application file for complete search history.

(56) References Cited

U.S. PATENT DOCUMENTS 5,403,897 A * 4/1995 Ebato .................... C08G 63/60
                                                    428/480
5,525,671 A * 6/1996 Ebato .................... C08G 63/00
                                                    525/386
(Continued)

FOREIGN PATENT DOCUMENTS

EP       2 311 896 A1    4/2011
JP       A-2002-88145    3/2002
(Continued)

OTHER PUBLICATIONS

Document N_ENGLISH Translation.*
(Continued)

Primary Examiner — Michael L Leonard
(74) Attorney, Agent, or Firm — Oliff PLC

(57) ABSTRACT

The present invention relates to a polyester polyol, suitable for use in the manufacture of a polyurethane, suitable for use in the manufacture of a polyurethane, the polyester polyol having an ABA-structure, in which A represents a lactide-oligomer and in which B represents an initiator. The initiator includes a reaction product having long chain dicarboxylic
(Continued)

acid components having 18 or more carbon atoms. The invention also relates to a method for the manufacture of the polyester polyol. The invention further pertains to polyurethanes including the before-mentioned polyester polyol as well as the use of these polyurethanes as an elastomer having a high toughness. The toughness is believed to originate from the combination of the hydrophobic character of the initiator and the hydrophilic character of the lactide parts in the polyol structure. The strength of the invented polylactide-polyurethane elastomers can be further improved by incorporating a carbodiimide in the elastomer material.

16 Claims, 2 Drawing Sheets

(51) Int. Cl.
  C08G 18/34   (2006.01)
  C08G 63/08   (2006.01)
  C08G 18/66   (2006.01)
  C08G 18/76   (2006.01)
  C08G 18/79   (2006.01)
  C09J 175/06  (2006.01)
  C08G 18/32   (2006.01)
  C08G 18/10   (2006.01)

(52) U.S. Cl.
  CPC ....... *C08G 18/348* (2013.01); *C08G 18/4202* (2013.01); *C08G 18/428* (2013.01); *C08G 18/4266* (2013.01); *C08G 18/4283* (2013.01); *C08G 18/4286* (2013.01); *C08G 18/4288* (2013.01); *C08G 18/664* (2013.01); *C08G 18/7671* (2013.01); *C08G 18/797* (2013.01); *C08G 63/08* (2013.01); *C09J 175/06* (2013.01)

(56) References Cited

U.S. PATENT DOCUMENTS

| | | | |
|---|---|---|---|
| 5,605,981 A * | 2/1997 | Imamura | C08G 63/60 524/779 |
| 6,037,384 A * | 3/2000 | Kakizawa | C08J 9/00 521/182 |
| 2003/0018099 A1* | 1/2003 | Fujihira et al. | 523/124 |
| 2007/0009465 A1* | 1/2007 | Lendlein | A61K 8/90 424/70.11 |
| 2009/0298977 A1* | 12/2009 | Kawahara | C08L 67/04 524/99 |
| 2010/0093888 A1* | 4/2010 | Endo | C08K 5/29 523/124 |
| 2012/0264905 A1* | 10/2012 | Shimura | C08G 18/428 528/58 |

FOREIGN PATENT DOCUMENTS

| | | | | |
|---|---|---|---|---|
| JP | 2002-103550 A | | 4/2002 | |
| JP | -2004143268 | * | 5/2004 | ............. C08L 67/00 |
| JP | 2004143268 | * | 5/2004 | ............. C08L 67/00 |
| WO | WO 2005/100429 A1 | | 10/2005 | |
| WO | WO 2008/037773 A1 | | 4/2008 | |

OTHER PUBLICATIONS

XP 002682863, Database WPI, Week 200252, Thomson Scientific, AN 2002-482824, 2002.
International Search Report issued in International Application No. EP/2013/057839 dated Jul. 10, 2013.
Written Opinion of the International Searching Authority issued in International Application No. EP/2013/057839 dated Jul. 10, 2013.

* cited by examiner

| PU-elastomer based on | Type | Shore A | Tensile strength (N) | Young's modulus (MPa) | Toughness (MPa) |
|---|---|---|---|---|---|
| | | ISO 868 | ISO 527-2 | | |
| Polyester polyol | A | 75 | 287 | 4 | 33 |
| Polyester polyol | B | 90 | 838 | 800 | 102 |
| Semi crystalline commercial Polyester polyol | C | 75 | 812 | 249 | 13 |

POLYESTER POLYOL FOR USE IN POLYURETHANE

FIELD OF THE INVENTION

The present invention relates to a polyester polyol, suitable for use in the manufacture of polyurethane, said polyester polyol having an ABA-structure, in which A represents a lactide-oligomer and in which B represents an initiator. The invention also relates to a method for the manufacture of such polyester polyol. The invention further pertains to a polyurethane composition comprising the before-mentioned polyester polyol and the use of this polyurethane composition as an elastomer having a high toughness.

BACKGROUND OF THE INVENTION

A polyester polyol mentioned in the opening paragraph is known as such from the international patent application published as WO2008/037773-A1. More in particular, this publication discloses a polyester polyol with an ABA-structure, in which the initiator part B originates from a diamine like 4,4'-diaminodiphenylmethane or from a diol like 1,4-butanediol. The length of the lactide oligomer part A in the polyol structure ranges substantially between 20 to 140 lactate unities. Moreover, the length of the oligomer at both ends of the polyol structure is substantially the same. The polyurethane obtained with this polyester polyol appears to show an increased glass temperature and improved mechanical properties.

Applicant has experienced that the known polyurethane shows a toughness which is too low for a number of applications. The toughness of a material is to be understood as the ability of the material to absorb energy and to deform plastically without fracturing. The toughness is a property which can be determined on the basis of the stress-strain curve or the load-elongation curve of a material, and is expressed in MPa.

SUMMARY OF THE INVENTION

The invention aims at providing a polyester polyol which does not have the disadvantage of the known polyol disclosed in the above-mentioned patent publication. More specifically, the invention has the object to provide a specific class of lactide-containing polyester polyols, which, when comprised in a polyurethane, gives such polyurethane a high toughness. This toughness should preferably be above 50 MPa, more preferably above 75 MPa and most preferably above 100 MPa. The toughness of the invented material as well as its elongation-to-break should moreover be stable over time. The invention further aims at providing a class of polyurethanes comprising lactide-containing polyester polyols.

These and other objects are achieved with a polyester polyol, suitable for use in the manufacture of a polyurethane, said polyester polyol having an ABA-structure, in which A represents a lactide-oligomer and in which B represents an initiator, which is characterized according to the present invention in that the initiator comprises a reaction product comprising a long chain dicarboxylic acid component having 18 or more carbon atoms.

Long chain alkane components comprising at least 18 carbon atoms appear to contribute highly to the hydrophobic character of the reaction product. This is especially the case when the alkane chain is hardly branched or not branched at all. Such long chain components tend to be non-polar and therefore prefer similar neutral and non-polar molecules. In such long chain alkane component, (almost) all carbon atoms in the chain are connected to two other carbon atoms. Carbon atoms at the end of the chain may be connected to only one other carbon atom, whereas a small minority of carbon atoms in the chain may connect to three or even four other carbon atoms. Alkane components fulfilling these properties exhibit a hydrophobic character.

The present invention is based on the insight acquired by the inventors that the use of lactide-containing polyester polyols having an ABA-structure with initiators B having a hydrophobic character increase the toughness of the polyurethane manufactured on the basis of such polyols. Without being bound by theory, the inventors believe that the combination of hydrophilic (lactide-based) and hydrophobic (initiator based) parts in a polyester polyol with an ABA structure is essential to the improved toughness properties of the polyurethane in which such polyol is comprised.

Another interesting embodiment of the invented polyester polyol has the special feature that the long chain dicarboxylic acid component consists substantially (i.e. more than 80% by weight) of dimer acid. Polyester polyols which contain such dimer acids are especially useful in the practical implementation of the present invention. The expression 'dimer acids' refers to a well-known class of dicarboxylic acids (or their esters). In reacted state, these dimer acids highly contribute to the hydrophobic character of the initiator. Such dimer acids are usually manufactured by dimerising unsaturated long chain aliphatic monocarboxylic acids having a length in the range of 16 to 24 carbon atom to dimers. The dimerisation is believed to proceed by possible mechanisms which include Diels Alder, free radical, and carbonium ion mechanisms. The dimer acid material usually contains 26 to 44 carbon atoms.

Particularly, examples include dimer acids (or their esters) derived from C18 and C22 unsaturated monocarboxylic acids (or their esters) which will yield, respectively, C36 and C44 dimer acids (or esters). Dimer acids derived from C18 unsaturated acids, which include acids such as linoleic and linolenic are particularly well known (resulting in C36 dimer acids). For example, the so-called DELTA 9,11 and DELTA 9,12 linoleic acids may dimerise into a cyclic unsaturated structures. This is only one possible structure; other structures, including acyclic structures can also be formed. The dimer acid products will normally also contain a proportion of trimer acids (C54 acids when using C18 starting acids), possibly even higher oligomers and also small amounts of the monomer acids.

Several different grades of dimer acids are available from commercial sources and these differ from each other primarily in the amount of monobasic and trimer acid fractions and the degree of unsaturation. C36 dimer fatty acids are commercially available under the trade name Pripol™ from Croda Ltd. Such Pripol compositions contain branched C36 dimerized fatty acids which are particularly useful as hydrophobic parts of the initiator in the implementation of this invention. Most common Pripol grades have a dimer content of approximately 80% by weight. Grades having a dimer content of 95% by weight or more are preferred as such grades contain less branched products.

Also interesting is the embodiment of the present invention which is characterized in that the reaction product additionally comprises short chain dicarboxylic acid component. Such component most generally has a molecular weight of less than 500 g/mol. Suitable dicarboxylic acids for such component include for example succinic acid, isophthalic acid, phthalic acid, terephthalic acid, decanedioic acid, dodecandioic acid and azelic acid or mixtures thereof. Of all possible dicarboxylic acids, the compound adipic acid is preferred. Dialkylesters or anhydrides of these dicarboxylic acids may be used as well. The a/b-ratio of the amount of short chain dicarboxylic acid component (a) and the long chain dicarboxylic acid components (all by weight) is preferably between 5 and 70, more preferably between 10 and 60 and most preferably between 30 and 55. Within these ranges, the toughness value can be optimized to a highest value.

Another embodiment of interest concerns a polyester polyol, which is characterized in that the reaction product also includes a linear alkane diol. Suitable alcohols include, for example, ethylene glycol, propylene glycol, 1,3-propanediol, diethylene glycol, dipropylene glycol, 1,4-butanediol, neopentyl glycol, 1,9-nonanediol, 1,10-decanediol or 1,12 dodecanediol or mixtures thereof. Of all linear alkanediols, the compound 1,6-hexanediol is preferred. The linear alkane diols may preferably be present in the polyester polyol in an amount of 5-70% by weight of the total components, more preferably between 30-55% by weight and most preferably 20-35% by weight. Within these ranges crystalline-related properties can be optimized.

Another embodiment of the present invented polyester polyol is characterized in that the lactide-oligomer part of the polyol comprises 4 to 16 lactoyl units. This means that each polyol unit has one initiator unit which is connected to two relatively short lactoyl oligomer units, each comprising at least two lactoyl units. Due to the ring-opening polymerization during the production of the polyester polyol, the cyclic lactide is ring-opened and thus converted into a linear molecule comprising two lactoyl units. Thus, the reaction conditions are chosen such that two relatively short chains of lactoyl units are bound to the initiator. The shortest possible chains consist of two lactoyl units, corresponding with a single lactide unit after ring-opening. In practice, both lactoyl oligomers bound to a single initiator need not have identical number of lactoyl units. However, the total length of both oligomers will generally be less than 16 lactoyl units. In practice this means that the amount of lactide in the polyester polyol ranges between 10-70% by weight, based on the total weight of the polyol. Preferably, this range is between 15 and 50% by weight.

The lactide used can be commercially obtained. Generally such lactides are prepared by depolymerization of PLA oligomers. Lactide can exist in three different geometric structures, which have a diastereomeric relationship. These different structures can be distinguished as R,R-lactide (or D-lactide), S,S-lactide (or L-lactide) and R,S-lactide (or meso-lactide). Mixtures of equal amounts of D- and L-lactide are often referred to as racemic lactide or rac-lactide. Within the scope of the present invention, the three pure lactides (being composed of only one diastereomer) as well as mixtures of two or more of the pure lactides can be used.

A further embodiment of special interest relates to a polyester polyol according to the present invention, which is characterized in that the polyester polyol has a mol weight between 800 and 4000 g/mol. In case that the mol weight reaches values below the under limit of 800, the prepared polyols have the disadvantage that the flexibility of the polyurethanes in which these polyols are used becomes rather low, which is undesired. In case that the mol weight of the polyester polyol reaches values above the upper limit of 4000, the prepared prepolymers have the disadvantage that the hardness of the polyurethanes in which these polyols are used becomes low, which is also not desired. In order to avoid both disadvantages with high certainty, polyester polyols having a mol weight in the range between 1000 and 3500 are preferred.

The invention also relates to a method for the manufacture of a polyester polyol. This method according to the invention is characterized in that amounts of a long chain dicarboxylic acid having 18 or more carbon atoms and a diol are combined in a reaction mixture, after which the temperature of the mixture is raised to above 200° C. to initiate the reaction, and that lactide and a catalyst are added to the reaction mixture after the reaction between the acid and the diol is completed.

Adding the lactide and the catalyst after completion of the reaction between the acid and the diol is essential for the implementation of the method according to the present invention. If the lactide and catalyst are added as from the beginning of the reaction, a so-called random polyester polyol is formed. Polyurethanes including such polyol do not exhibit an interestingly high toughening effect. In order to guarantee that the initiator formed in the reaction of the acid and the diol has hydroxyl end groups, the amount of the diol should be added in (slight) access to the reaction mixture. To optimize desired properties of the ultimate polyurethane, the reaction mixture may also contain other acids and alcohols, such as mono-acid and tri-acids as well as mono-alcohols and tri-alcohols.

As a catalyst, usual catalysts for lactide polymerization may be used, like Sn(II)-compounds. The compound Sn(II)-octoate has proved to be an excellent catalyst in the course of manufacturing the polyester polyols according to the present invention.

An interesting embodiment of the invented method is characterized in that the reaction mixture also comprises a short chain dicarboxylic acid, preferably adipic acid. The addition of such acid can improve the crystallinity of the ultimate polyurethane can be improved.

Another interesting embodiment of the invented method has the feature that the diol is 1,6-hexanediol. The presence of this diol in the polyol according to the present invention provides the ultimate polyurethane the advantage of additional crystallinity.

An interesting polyurethane composition of the present invention is characterized in that the composition polymer also comprises carbodiimide. The addition of such carbodiimide significantly adds to the strength of the polylactide-urethane copolymer, without loss of elongation. Moreover, the elongation at break is improved in polylactide-urethane copolymers which comprise carbodiimide. The amount of carbodiimide in the copolymer ranges between 0.1 and 5 wt. % of the polylactide-urethane copolymer. Amounts larger than 5 wt. % of added carbodiimide may result in an undesired decrease of the earlier mentioned advantageous properties of the copolymer. Amounts smaller than 0.1 wt. % of added carbodiimide may cause that the effect of the added compounds is too low. An optimal compromise between both situations is reached in case that the amount of carbodiimide in the copolymer ranges between 0.2 and 2 wt. %.

The invention also relates to a polyurethane composition comprising the polyester polyol as described in the above. Such polyurethane composition can be used with great advantage as an elastomer having a toughness of at least 50 MPa, preferably 75 MPa and most preferably 100 MPa.

BRIEF DESCRIPTION OF THE DRAWINGS

The invention will be explained in more details by means of several experiments and the drawing, in which.

DESCRIPTION OF PREFERRED EMBODIMENTS

Figures 1, 2:
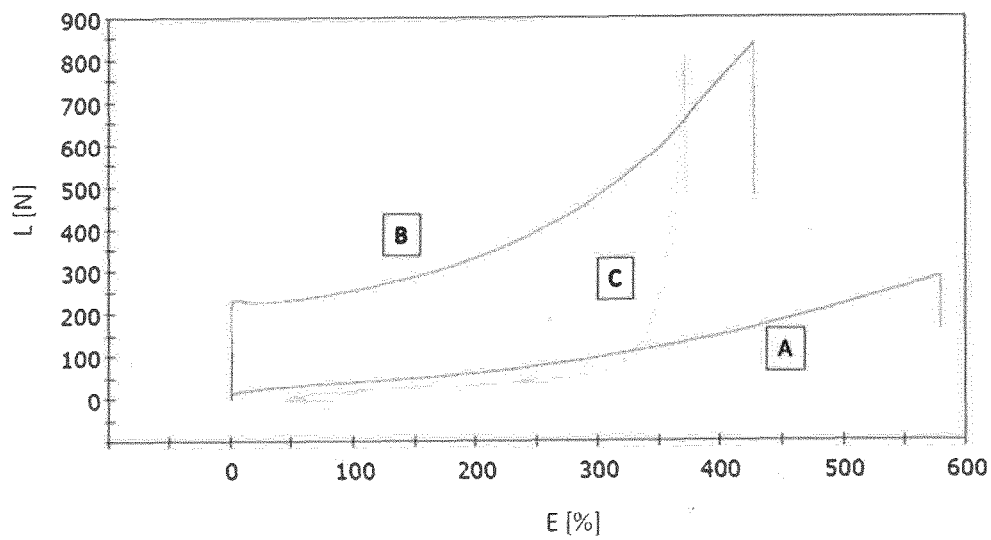
FIG. 1 shows a stress-strain curve of three polyurethanes comprising polyester polyols, one of them being according to the present invention.
FIG. 2 shows a table with mechanical data of the three polyurethanes comprising polyester polyols.

Below the manufacture of two lactide-containing polyester polyols is described, one of them being according to the present invention whereas the other is not according to the present invention.

Polyester polyol A, a polyester polyol not according to the present invention, was prepared as follows. In a reactor equipped with a stirrer, a thermometer, a gas inlet and a condenser, 50 parts of PRIPOL 1006, 50 parts of Adipic acid, 62.3 parts of 1,6-hexanediol, 52.45 parts of L-lactide (Puralact® B3) and 0.05 parts of tin octoate as polymerization catalyst were charged. The temperature was raised to 220-230° C. under normal pressure in a nitrogen atmosphere. The mixture was allowed to react and formed water was removed of the system. The esterification reaction was conducted until desired acid- and hydroxyl values were obtained. The evaluation results of the obtained polyester polyol gave an acid value<1 mg KOH/g and a hydroxyl value of 55 mg KOH/g. As all components were initially mixed and reacted, a random polyester polyol was obtained.

Polyester polyol B, a polyester polyol according to the present invention, was prepared as follows. In a reactor equipped with a stirrer, a thermometer, a gas inlet and a condenser, 50 parts of PRIPOL 1006, 50 parts of Adipic acid, 62.3 parts of 1,6-Hexanediol, charged. The temperature was raised to 220-230° C. under normal pressure in a nitrogen atmosphere. The mixture was allowed to react and water was removed of the system. The esterification reaction was conducted until desired acid- and hydroxyl values were obtained. The evaluation results of the obtained polyester polyol gave an acid value<1 mg KOH/g and a hydroxyl value of 75 mg KOH/g. The temperature was subsequently lowered to 160° C. after which 52.45 parts of L-lactide (Puralact® B3) and 0.05 parts of tin octoate as polymerization catalyst were charged. The reaction was conducted until desired acid- and hydroxyl values were obtained. The evaluation results of the obtained polyester polyol gave an acid value<1 mg KOH/g and a hydroxyl value of 55 mg KOH/g. As the lactide was added after the reaction of the other components was substantially completed to form a hydrophilic initiator, the final reaction product obtained was a polyester polyol of the type ABA, in which A represents a lactoyl-oligomer and B represent the initiator.

From both polyester polyol A and polyester polyol B, a polyurethane elastomer composition was made as follows. In a cup, 100 parts of the polyol, 11.2 parts of 1,4-butanediol and 46.5 parts of diphenylmethane diisocyanate (MDI) were mixed. The so-obtained mixture was de-aired, slowly poured into a mold and cured at 110° C. for 20 hours to form tensile strength dumbbells. After cooling down to room temperature, the cured dumbbells were removed from the mold and evaluated on their physical and chemical properties. For comparative purposes, a commercial obtainable polyurethane composition (C) was obtained. This polyurethane composition comprises a polyester polyol having a semi-crystalline structure.

FIG. 1 shows a spectrum depicting measured stress-strain curves of the dumb bells of the three polyurethanes, described in the previous paragraph. These measured curves were recorded on an Instron 3366 apparatus under conditions defined by the ISO 527-2 Norm. In these curves, the load L (Newton) is measured as a function of the extension E of the dumbbell strips (percentage).

From FIG. 1, it can be determined that the toughness (in MPa) is largest by far for the invented polyurethane composition (type B) comprising the lactide-containing polyester polyol with the ABA-structure. The toughness of the lactide-comprising polyurethane composition in which the initiator components and the lactide (or lactoyl) components are randomly distributed in the polyol shows a lower toughness (type B). Lowest values are obtained with the polyurethane composition comprising a semi-crystalline polyester polyol (type C).

FIG. 2 shows a table in which various mechanical properties of polyurethanes based on three different polyester polyols are summarized. From this table it can be concluded that the presently invented polyester polyol with the ABA-structure is best in all depicted properties as compared to the other two polyurethanes not according to the invention. Thus, the Shore A (measured according to ISO 868 Norm), the Tensile strength (in N), the Young's modulus (in MPA, measured according to ISO 527-2 Norm) and the toughness are highest.

From the invented polyester polyol B, both a non-modified polyurethane composition elastomer and a carbodiimide-modified polyurethane composition elastomer were made as follows. In a cup, 100 parts of the polyol and 11.2 parts of 1,4-butanediol (BDO, chain-extender) were mixed thoroughly and de-aired. Subsequently 46.5 parts of diphenylmethane diisocyanate (MDI, Lupranat MIP) were added to the mixture to obtain the non-modified elastomer. For obtaining the carbodiimide-modified elastomer, 2 parts of Bioadimide 100 (a carbodiimide) was added to the mixture together with 46.5 parts of MDI. The so-obtained mixtures were de-aired again, slowly poured into a mold and cured at 110° C. for 20 hours to form tensile strength dumbbells. After cooling down to room temperature, the cured dumb bells were removed from the mold, placed for a certain period of time in water and subsequently evaluated on their physical and chemical properties.

For tensile tests of the produced elastomers, two series of the dumb bells (modified resp. non-modified) produced as described in the previous paragraph were placed in water at 40° C. for a period of 50 days. During this period several dumb bells of each series were removed each day, dried for 7 days at 23° C. and subsequently measured for several tensile properties.

Figure 3:
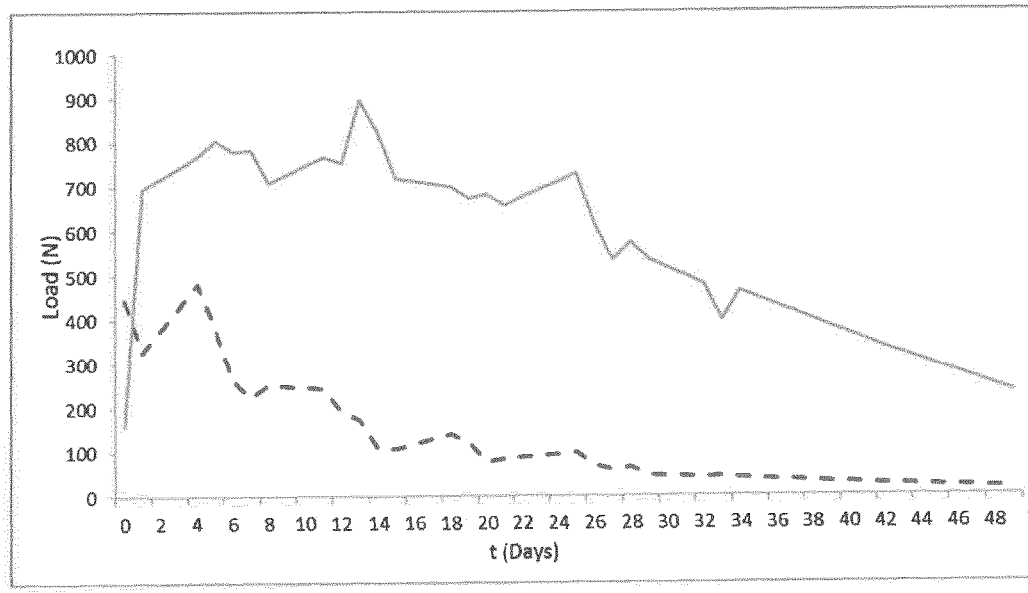
FIG. 3 shows a graph in which the strength of the (carbodiimide-modified) polylactide-urethane copolymer is depicted as a function of time.

FIG. 3 shows a graph in which the maximum load (N in MPa) of the dried dumbbells is depicted as a function of time (t in days). The maximum load is defined as the load at which the dumb bells break. The dashed line represents the series of dumb bells made of non-modified elastomer material. The solid line represents the series of dumb bells made of carbodiimide-modified elastomer material. FIG. 3 clearly indicates that the modification of the polylactide-urethane copolymer material with carbodiimide results in a significant increase in strength. Thus the maximum load which can be applied on such modified elastomer is considerably higher than the load which can be applied on the non-modified elastomer.

Figure 4:
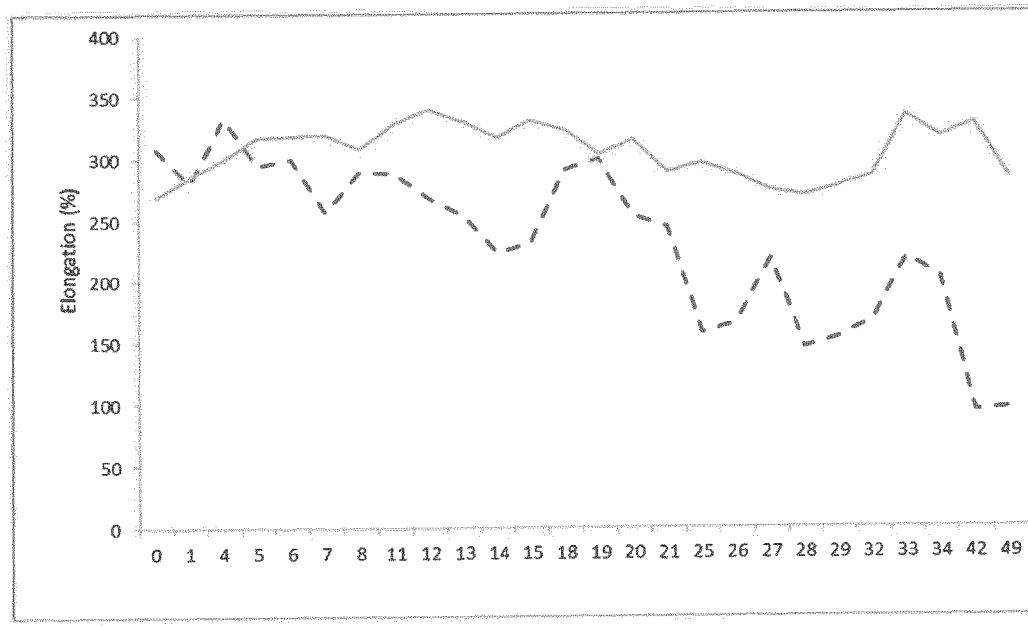
FIG. 4 shows a graph in which the elongation at break of the (carbodiimide-modified) polylactide-urethane copolymer is depicted as a function of time.

FIG. 4 shows a graph in which the relative maximal elongation load (%) of the dried dump bells is depicted as a function of time (t in days). The relative maximal elongation load is defined as maximal length increase percentage obtainable with the material before the dumb bells breaks. The dashed line represents the series of dumb bells made of non-modified elastomer material. The solid line represents the series of dumb bells made of carbodiimide-modified material. FIG. 4 clearly indicates that the modification of the polylactide-urethane copolymer material with carbodiimide results in that the relative maximal elongation load remains stable over the time of at least 30 days. The relative maximal elongation load of the non-modified elastomer however decreases over the time of at least 30 days.

Polyurethane composition adhesive materials have been prepared as follows. From both polyester polyol A (random) and polyester polyol B (ABA-structure), a 2 component polyurethane adhesive was prepared. For that purpose, 100 parts of the polyol and 46.5 parts of diphenylmethane diisocyanate (MDI, Lupranat MIP, BASF) were mixed in a cup. Just before application of the adhesive, a tin catalyst (dibutyl tin dilaurate, DBTL) was added to the mixture during intense stirring. The so-obtained adhesive was applied as a thin layer on the surfaces of two substrates of identical material, which substrates were subsequently pressed together and cured for 8 hours at a temperature of 110° C. Subsequently the lap shear adhesion was measured various substrates of aluminum and polypropylene. For comparative purposes, commercial obtainable polyurethanes C and D were used. Polyurethane C (Priplast™ 3192, Croda Ltd.) comprises a commercially obtainable polyester polyol having a semi-crystalline structure. Polyurethane D (PTMEG, MW 2000, Invista) comprises a commercially obtainable polyester polyol having an amorphous structure.

In summary, it is observed that the present invention pertains to a polyester polyol, suitable for use in the manufacture of a polyurethane, said polyester polyol having an ABA-structure, in which A represents a lactide-oligomer and in which B represents an initiator. The inventive feature is that the initiator comprises a reaction product comprising long chain dicarboxylic acid components having 18 or more carbon atoms, preferably dimer acids. Such compounds show a hydrophobic character. The invention also relates to a method for the manufacture of such polyester polyol. The invention further pertains to polyurethanes comprising the before-mentioned polyester polyol as well as the use of these polyurethanes as an elastomer having a high toughness. Said toughness is believed to originate from the combination of the hydrophobic character of the initiator and the hydrophilic character of the lactide parts in the polyol structure. The maximum load as well as the relative maximal elongation load of the invented polylactide-polyurethane elastomers can be further improved by incorporating a carbodiimide in the elastomer material.

The person skilled in the art will realize that the present invention is by no means limited to the preferred embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. Polyester polyol, suitable for use in the manufacture of a polyurethane, said polyester polyol having an ABA-structure, in which A represents a lactide-oligomer and in which B represents an initiator, wherein the initiator comprises a reaction product comprising the residue of a long chain dicarboxylic acid component having 18 or more carbon atoms and a linear alkane diol, and wherein the polyester polyol has a molecular weight between 800 and 4000 g/mol.

2. Polyester polyol according to claim 1, wherein the long chain dicarboxylic acid component consists substantially of dimer acid.

3. Polyester polyol according to claim 2, wherein the reaction product additionally comprises a short chain dicarboxylic acid component.

4. Polyester polyol according to claim 1, wherein the linear alkane diol is selected from the group consisting of: ethylene glycol; propylene glycol; 1,3-propanediol; 1,4-butane-diol; 1,6-hexanediol; 1,9-nonanediol; 1,10-decanediol; 1,12-dodecanediol; and mixtures thereof.

5. Polyester polyol according to claim 1, wherein the lactide-oligomer part of the polyol comprises 4 to 16 lactoyl units.

6. Method for the manufacture of a polyester polyol, wherein amounts of a long chain dicarboxylic acid having 18 or more carbon atoms and a linear alkane diol and are combined in a reaction mixture, whereby the amount of diol is added in excess to the amount of long chain dicarboxylic acid, after which the temperature of the mixture is raised to above 200° C. to initiate the reaction, and that lactide and a catalyst are added to the reaction mixture after the reaction between the acid and the diol is completed to form a polyester polyol with a molecular weight between 800 and 4000 g/mol.

7. Method according to claim 6, wherein the reaction mixture also comprises a short chain dicarboxylic acid.

8. Method according to claim 6, wherein the diol is 1,6-hexanediol.

9. Polyurethane composition comprising the polyester polyol according to claim 1.

10. Polyurethane composition according to claim 9, wherein the composition also comprises carbodiimide.

11. The polyurethane composition according to claim 9 as an elastomer having a toughness of at least 50 MPa.

12. Polyester polyol according to claim 1, wherein the reaction product additionally comprises a short chain dicarboxylic acid component.

13. Polyester polyol according to claim 12, wherein the short chain dicarboxylic acid component has a molecular weight of less than 500 g/mol.

14. Polyester polyol according to claim 12, wherein the short chain dicarboxylic acid component is selected from the group consisting of: adipic acid; succinic acid; isophthalic acid; phthalic acid; terephthalic acid; decanedioic acid; dodecandioic acid; azelic acid; and, mixtures thereof.

15. Polyester polyol according to claim 1, wherein the polyester polyol has a molecular weight between 1000 and 3500 g/mol.

16. Method according to claim 6, wherein the polyester polyol has a molecular weight between 1000 and 3500 g/mol.

* * * * *